United States Patent

Pinkerton et al.

Patent Number: 5,907,105
Date of Patent: May 25, 1999

[54] MAGNETOSTRICTIVE TORQUE SENSOR UTILIZING RFE$_2$-BASED COMPOSITE MATERIALS

[75] Inventors: Frederick Eugene Pinkerton, Shelby Township; Jan Francis Herbst, Grosse Pointe Woods; Tenneille Weston Capehart, Rochester Hills; Thomas Arthur Perry, Washington; Martin Stephen Meyer, Southfield, all of Mich.

[73] Assignee: General Motors Corporation, Detroit, Mich.

[21] Appl. No.: 08/897,411

[22] Filed: Jul. 21, 1997

[51] Int. Cl.$^6$ ........................................................ G01L 3/02
[52] U.S. Cl. ...................................................... 73/862.336
[58] Field of Search ..................... 73/862.333, 862.334, 73/862.335, 862.336; 148/101, 102, 103, 104

[56] References Cited

U.S. PATENT DOCUMENTS

| | | |
|---|---|---|
| 4,152,178 | 5/1979 | Malekzadeh et al. ............... 148/103 |
| 4,760,745 | 8/1988 | Garshelis ............................. 73/862.36 |
| 4,882,936 | 11/1989 | Garshelis ............................. 73/862.36 |
| 4,896,544 | 1/1990 | Garshelis ............................. 73/862.36 |
| 5,351,555 | 10/1994 | Garshelis ........................... 73/862.335 |
| 5,465,627 | 11/1995 | Garshelis ........................... 73/862.335 |

FOREIGN PATENT DOCUMENTS 03269228 11/1991 Japan .
06256912 9/1994 Japan .

OTHER PUBLICATIONS

Garshelis, "A Torque Transducer Utilizing a Circularly Polarized Ring," *IEEE Transactions on Magnetics*, vol. 28, No. 5, Sep. 1992, pp. 2202–2204.

Pinkerton et al., "Magnetostrictive SmFe2/Metal Composites," Applied Physics Letters, V. 70, No. 19, pp. 2601–2603. May 12, 1997.

Peters, "Production and Evaluation of REFe2–Nickel Composite Magnetostictive Materials," Final Report to Naval Electronics System Command Contract No. N00039–77–0108, Jan. 1979.

Peters et al., Nickel Composite Magnetostrictive Material Research for Ultrasonic Transducer, Final Report to Naval Electronic Systems Command Contract No. N00039–76–C–0017, Jan. 1977.

*Primary Examiner*—George Dombroske
*Assistant Examiner*—Jewel V. Thompson
*Attorney, Agent, or Firm*—George A. Grove

[57] ABSTRACT

This invention provides an improvement to magnetostrictive torque sensors giving an output signal indicative of the torque applied about the axis of a shaft where the shaft includes a magnetostrictive ring, attached to or formed as a part of the shaft so that the torque applied to the shaft is applied proportionally to the ring, and the ring consists essentially of novel composites consisting of magnetically hard and highly magnetostrictive rare earth (iron)$_2$ binary compound particles embedded in Cu, Fe, or other suitable metals.

18 Claims, 4 Drawing Sheets

5,907,105

MAGNETOSTRICTIVE TORQUE SENSOR UTILIZING RFE$_2$-BASED COMPOSITE MATERIALS

TECHNICAL FIELD

This invention pertains to torque sensors and more particularly to torque sensors utilizing magnetostrictive rare earth-iron (RFe$_2$) based composite materials.

BACKGROUND OF THE INVENTION

Measurement of the torque applied to a rotating shaft has long been of considerable industrial interest. In particular, a reliable, accurate, and inexpensive torque sensor is crucial to the development of electric power steering systems for automotive vehicles. The specifications of U.S. Pat. Nos. 4,760,745, 4,882,936, 4,896,544, 5,351,555 and 5,465,627, issued to Ivan J. Garshelis, describe previous methods and materials for measuring torque.

The '555 patent and its divisional case, the '627 patent, describe an arrangement for a torque sensor (see FIG. 1 of either patent) aimed for use in an automotive power steering system. It is a non-contact device comprising a ring of magnetic, magnetoelastic material mounted to the shaft whose torque is to be measured. While Garshelis uses the term "magnetoelastic" to properly characterize the effect of elastic torque strain on the magnetization of his torque sensor, this specification uses the term "magnetostrictive" as appropriate to characterize the material that senses the applied torque.

A vital feature of the sensor is confinement of the ring's magnetization to the circumferential direction when no torque is applied to the shaft. When torque is applied to the shaft and conveyed to the ring, the magnetization of the ring tilts away from the circumferential direction, producing an axial component of the magnetization whose magnitude and sign depend on the size and rotational sense of the torque. The axial magnetization generates a magnetic field external to the ring which is measured by a secondary detector, i.e., a magnetic field sensor. In the embodiment of U.S. Pat. No. 5,465,627, the magnetostrictive ring is formed of nickel maraging steel and is mechanically attached to the shaft by a vigorous force fit. Besides providing for attachment, the large hoop stress $\sigma_h$ thus created in the ring plays the crucial role of generating an effective uniaxial anisotropy $K_u$ which keeps the ring magnetization in the circumferential direction in the absence of torque. If the magnetostriction of the ring is assumed to be isotropic, $K_u$ is equal to $3\lambda\sigma_h/2$, where $\lambda$ is the isotropic magnetostriction constant of the ring material. For maraging steel $\lambda$~30 ppm (cf. I. J. Garshelis, "A Torque Transducer Utilizing a Circularly Polarized Ring", IEEE Trans. Magn. 28, 2202 (1992), hereinafter, Garshelis Paper), a relatively small value, and $\sigma_h$ must be on the order of the yield strength of the ring (655 MPa for T-250 maraging steel) to furnish sufficiently large $K_u$.

This combination has several major disadvantages, including the following. First, generating large and uniform $\sigma_h$ requires large press forces to mate carefully machined matching tapers on the shaft outside diameter and the ring inside diameter. Unless precisely done, this attachment procedure can easily generate axial or radial (i.e., non-hoop) stresses which can cause substantial non-uniformity of the ring magnetization in the absence of torque. Second, with $\sigma_h$ near the yield strength of maraging steel, the coercivity in the circumferential direction is only ~5 Oe (FIG. 5 of Garshelis Paper), making the output of the device very susceptible to degradation by small stray magnetic fields or residual stresses. Any disturbance to the circumferential magnetization in the untorqued state can result in loss of sensitivity and/or generation of a spurious torque signal. Third, the axial magnetization with torque applied is proportional to $\lambda$ according to the model of the Garshelis Paper, and the small value of $\lambda$ makes for correspondingly small output signal.

SUMMARY OF THE INVENTION

This invention provides an improvement to magnetostrictive torque sensors of the type giving an output signal indicative of the torque applied about the axially extending axis of a shaft or the like. Typically such sensors include a magnetostrictive element, such as, e.g., a ring, attached to or formed as a part of the shaft so that the torque applied to the shaft is applied proportionally to the ring or like element. The ring is magnetically polarized in a circumferential direction. At zero torque, the magnetization is thus oriented around the circumference of the ring and, in principle, no magnetic field exists outside the ring. In the Garshelis maraging steel ring, this circumferential confinement of the magnetization is due to the strain in the ring produced by a large hoop stress.

When torque is then applied to the shaft and attached ring, the magnetostrictive ring produces a magnetic field outside of itself that varies with the applied torque. A magnetic field sensor located close to the ring or like element senses the magnitude of the torque-generated magnetic field and produces an output signal in response.

In particular, this invention provides an improvement in the magnetostrictive element. A family of magnetostrictive composites is employed that provides high values of magnetostriction and does not require a hoop stress to retain the circumferential magnetization.

A related copending U.S. patent application Ser. No. 08/673,550, filed Jul. 1, 1996 and assigned to the assignee of this invention, discloses novel, mechanically strong composites consisting of highly magnetostrictive rare earth-(iron)$_2$ compounds, e.g., TbFe$_2$ or SmFe$_2$, embedded in a strengthening matrix of Al, Fe, or other metals. Such composites can also be processed so as to have appreciable magnetic coercivity. These composites are a distinct alternative to maraging steel for the ring sensor element and offer at least three potential advantages. (1) Their magnetostriction ($\lambda$, in parts per million) can be as large as several hundred ppm, an order of magnitude greater than that of maraging steel. (2) When fabricated with melt-spun SmFe$_2$, for example, as the magnetostrictive constituent, they can also exhibit coercivities much greater than that of maraging steel. This coercivity, combined with the RFe$_2$ material's magnetocrystalline anistropy, provides the mechanism whereby the magnetization is retained in the circumferential direction in the absence of torque, thereby obviating the need for large hoop stress and hence eliminating its attendant disadvantages. (3) In principle the magnetocrystalline anisotropy constant K can be tailored by forming Sm$_{1-x}$R$_x$Fe$_2$ or Tb$_{1-x}$R$_x$Fe$_2$ pseudobinary compounds with other rare earth elements R (including Y). This is an important feature since the axial magnetization developed in response to torque is in first approximation proportional to $|\lambda/K|$.

Thus, a composite ring is formed of discrete particles of RFe$_2$, preferably Sm$_{1-x}$R$_x$Fe$_2$ or Tb$_{1-x}$R$_x$Fe$_2$, pseudobinary compounds embedded in a strengthening metal matrix phase. R may be any of the rare earth elements such as yttrium, lanthanum, cerium, praseodymium, neodymium, samarium, gadolinium, terbium, dysprosium, holmium, erbium, thulium, ytterbium or lutetium or mixtures of them. The composite is made by suitable hot deformation of a particulate mixture of rare earth-iron particles and metal particles, suitably aluminum, copper, iron, magnesium, tungsten or nickel particles, so as to form a continuous metal matrix around the magnetostrictive rare earth-iron particles. The magnetostrictive ring is circumferentially magnetized and then bonded onto or into the torque shaft for utilization of the sensor combination. The described rare earth-(iron)$_2$ compounds display appreciable intrinsic coercivity. $H_{ci}$ is at least 100 Oe. When the RFe$_2$ materials are prepared by melt spinning, the resulting magnetostrictive powders typically have a coercivity, $H_{ci}$, of over 2000 Oe. When fashioned into a composite, $H_{ci}$ of the composite also exceeds 2000 Oe when the matrix metal is nonmagnetic, and in any case exceeds 100 Oe even for magnetic matrix metals such as Fe or Ni. The composite ring retains its circumferential magnetization without resorting to press fits or other hoop stress application. Further, as described above, the large magnetostriction of the composite ring provides a torque signal of ample strength as to be detectable above stray background fields.

These and other objects and advantages of the invention will become more apparent from a detailed description thereof which follows. Reference will be had to the drawings.

DESCRIPTION OF THE PREFERRED EMBODIMENT

Figure 1A:
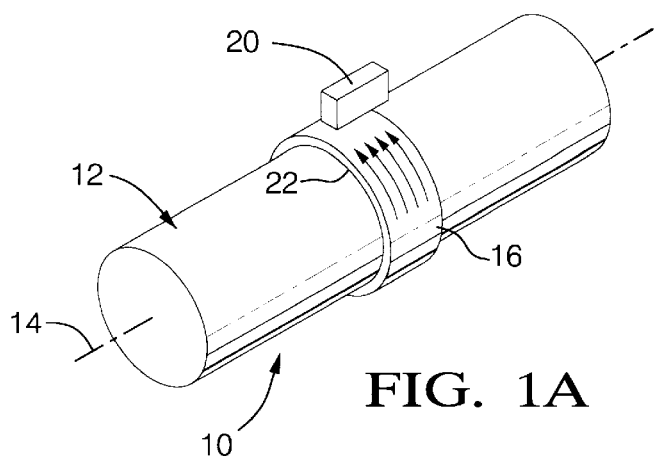
FIG. 1A is an assembly view showing a shaft, a magnetostrictive ring in accordance with the invention and a magnetic field sensor.

FIG. 1 shows a representative torque sensor 10. Torque sensor 10 includes the combination of a round shaft 12 having an axis 14 through the center of the shaft. The shaft 12 rotates about axis 14 upon which a torque is applied along the axis. Attached to or incorporated in shaft 12 is a magnetostrictive ring 16 that is joined to the shaft in a way that any torque applied to the shaft 12 will be transmitted in proportional fashion to ring 16. Ring 16 is magnetized circumferentially as indicated by the directional arrows 18. A magnetic field sensor 20 is suitably positioned close to ring 16 but not in physical contact therewith. Shaft 12 may be a steering column, for example. It is of mechanical design and composition suitable to withstand the torque and other working loads that the shaft is expected to experience. However, it is preferred that shaft 12 has very low magnetic permeability so as not to affect the detection of torque in the shaft in accordance with the practices described herein.

An example of a suitable material for shaft 12 would be an aluminum alloy. A suitably chosen aluminum alloy would be particularly useful in automotive steering shaft applications.

Figure 1B:
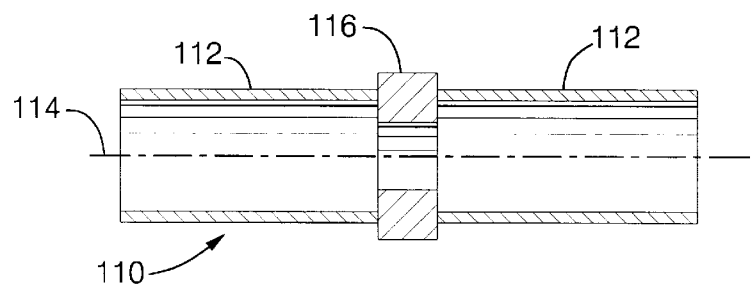
FIG. 1B shows a different embodiment in which the shaft is hollow and the magnetostrictive ring is fixed for testing between two sections of the shaft.

The magnetic field sensor 20 may be a Hall effect sensor or a sensor that operates based on its magnetoresistance properties or any other suitable magnetic field sensor which provides an electrical output that varies in response to the magnitude and direction of a magnetic field induced in ring 16 by torque in shaft 12 (FIG. 1A) or in ring 116 by shaft 112 (FIG. 1B).

The subject invention is particularly directed to an improvement in the magnetostrictive ring 16 in FIG. 1A or 116 in FIG. 1B. In other respects, the practice of the invention benefits from the descriptions in the prior art such as the Garshelis patents '555 and '627 identified above. However, in using the improved magnetostrictive element of the subject invention, the design and assembly of the sensor combination is greatly simplified because it does not need, indeed preferably does not employ, a press fit of the ring 16 to shaft 12. The ring may simply be bonded to the shaft in a way in which torque imposed on the shaft is transmitted proportionally to the ring, but there need be no reliance on a stress induced in the ring in order for it to fulfill its intended function in accordance with this invention.

The fabrication of composite magnetostrictive elements has been detailed in copending patent application Ser. No. 08/673,550, and that disclosure is incorporated herein by reference. Therein two techniques are described for generating a family of magnetostrictive RFe$_2$ constituents dispersed as particles in a metal matrix, for example, SmFe$_2$ or Sm$_{1-x}$R$_x$Fe$_2$ particles dispersed in an iron matrix. One can use either annealed Sm-Fe ingots or melt-spun and crystallized Sm-Fe ribbons. Both techniques yield essentially single-phased SmFe$_2$ material; they are distinguished primarily by their hard magnetic properties. Ingot-based SmFe$_2$ has significant but modest intrinsic coercivity $H_{ci}$ ($100 \leq H_{ci} \leq 540$ Oe) whereas melt-spun SmFe$_2$ has much higher coercivity ($H_{ci} \geq 2000$ Oe). For the purpose of making a torque sensor, it is preferred to employ a magnetically hard magnetostrictive material as described in (2) above. For this reason, it is preferred to use composites made with high coercivity (at least 1000 Oe) melt-spun SmFe$_2$ or TbFe$_2$.

TbFe$_2$ and SmFe$_2$ have the largest magnetostriction of the RFe$_2$ family. Samarium is more abundant than terbium. TbFe$_2$ has positive magnetostriction and SmFe$_2$ has negative magnetostriction; both have the same sign of magnetocrystalline anisotropy.

The composites can be further sorted into two categories—those in which the matrix metal component is non-magnetic, for example, Cu, Al, W, or Mg, or those which use a matrix metal which is itself magnetic, such as Fe or Ni. The latter magnetic metals typically have little coercivity of their own ($H_{ci}$<100 Oe), and also contribute little to the magnetostriction of the composite ($\lambda$~−7 ppm for polycrystalline Fe and $\lambda$~−34 ppm for polycrystalline Ni). Accordingly, two examples using $Sm_{1-x}R_xFe_2$ composites are included herein, one using the non-magnetic matrix metal Cu and one using Fe. Additionally, an example is included of using $Tb_{1-x}R_xFe_2$ magnetostrictive material in a magnetic Fe matrix.

Amorphous Sm-Fe ribbons were made by melt-spinning a pre-alloyed ingot of $SM_{0.33}Fe_{0.67}$ at a quench wheel speed of 30 m/s, from which crystalline $SmFe_2$ was subsequently obtained by annealing for 15 minutes at 700° C. The ribbons were powdered by ball milling, and a composite with equal volumes of $SmFe_2$ and Cu powder was made by hot pressing at 470° C. using a press pressure of 95 MPa and a time at temperature not exceeding five minutes.

Amorphous $(SM_{0.95}Dy_{0.10})Fe_2$ ribbons were made by melt-spinning a pre-alloyed ingot at a quench wheel speed of 30 m/s [excess Sm was included to offset vaporization of Sm during melt-spinning so that the final composition was probably close to $(Sm_{0.9}Dy_{0.1})Fe_2$]. Crystalline $(Sm_{0.95}Dy_{0.10})Fe_2$ was subsequently obtained by annealing for 15 minutes at 700° C. The partial substitution of Sm by Dy in this alloy is an example of using other rare earths to modify the magnetocrystalline anisotropy of the $SmFe_2$ phase, as described under point (3) above. The addition of dysprosium is intended to reduce the magnetocrystalline anisotropy to enable slightly easier rotation of the magnetization upon application of torque to produce a more perceptible signal. The ribbons were powdered by ball milling, and a composite with equal volumes of $(Sm_{0.95}Dy_{0.10})Fe_2$ and Fe powder was made by hot pressing at 610° C. using a press pressure of 95 MPa and a time at temperature not exceeding five minutes.

$(Tb_{0.50}Dy_{0.50})Fe_2$ ribbons were made by melt spinning a pre-alloyed ingot at a quench wheel speed of 22 m/s and annealing for 15 minutes at 700° C. Partial substitution of Tb by Dy is a further example of modifying the magnetocrystalline anisotropy using other rare earths, point (3) above. The ribbons were powdered by ball milling, and a composite with equal volumes of $(Tb_{0.50}Dy_{0.50})Fe_2$ and Fe powder was made by hot pressing at 610° C. using a press pressure of 95 MPa and a time at temperature not exceeding five minutes.

Figure 2:
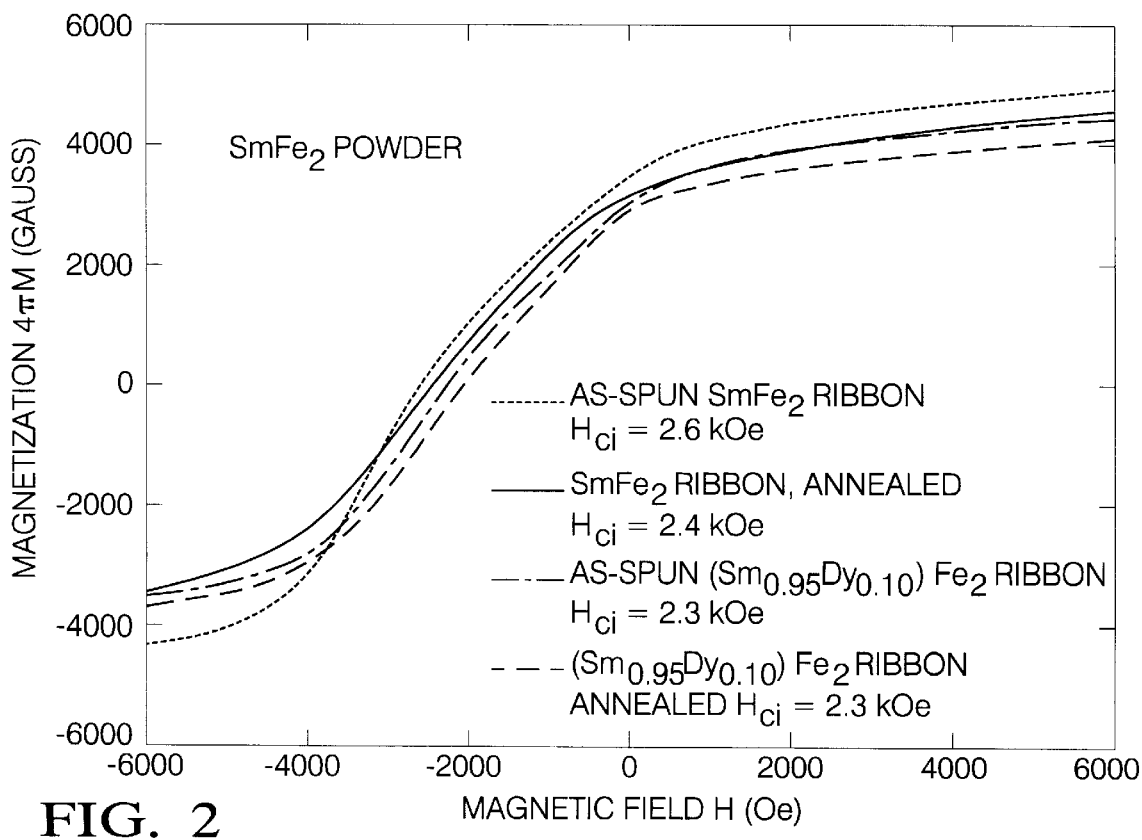
FIG. 2 is a graph of demagnetization curves for melt-spun SmFe$_2$ and (Sm$_{0.95}$Dy$_{0.10}$)Fe$_2$ ribbons measured before and after a crystallization heat treatment.

Demagnetization curves are shown in FIG. 2 for melt-spun $SmFe_2$ and $(Sm_{0.95}Dy_{0.10})Fe_2$ powders both in the as-spun state and after the crystallization heat treatment (prior to forming the composites). Before heat treatment, the ribbons are amorphous as determined by x-ray diffraction. After heat treatment, both compositions are converted to essentially singlephased $SmFe_2$ or $(Sm_{0.95}Dy_{0.10})Fe_2$ material. The 10% Dy substitution has only a minor impact on the magnetic properties. Furthermore, there is little change in the magnetic properties on crystallization of the amorphous phase. As an aside, composites can be formed from the amorphous ribbons (at least with matrix materials such as Al and Cu which can be consolidated at temperatures below about 560° C., the crystallization temperature of the ribbons); the highest magnetostriction, however, is obtained using crystallized material.

Figure 3:
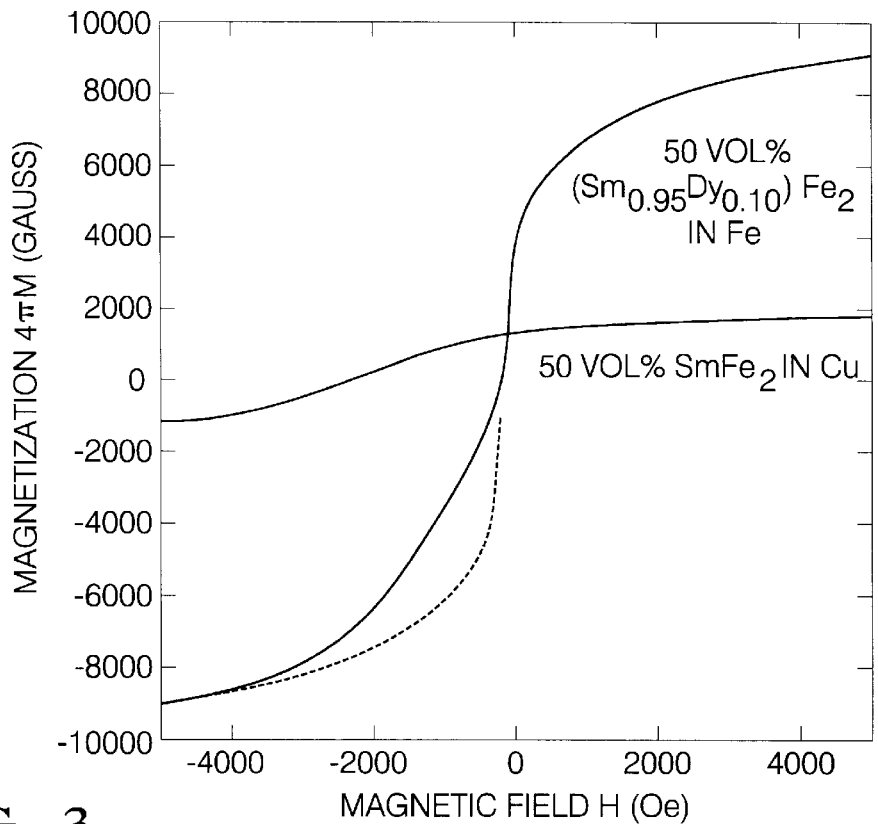
FIG. 3 is a graph of demagnetization curves for hot pressed 50 volume percent SmFe$_2$/Cu and (Sm$_{0.95}$Dy$_{0.10}$)Fe$_2$/Fe composites. The dotted line shows the hypothetical demagnetization curve for the (Sm$_{0.95}$Dy$_{0.10}$)Fe$_2$/Fe composite in the absence of a high coercivity component.

FIG. 3 shows the demagnetization curves of the resulting hot pressed composites $SmFe_2$/Cu and $(Sm_{0.95}Dy_{0.10})Fe_2$/Fe. When the host metal is non-magnetic, as with $SmFe_2$/Cu, the demagnetization curve is essentially that of the starting $SmFe_2$ powder but reduced to reflect the 50% dilution. The coercivity of this composite is virtually identical to that of the starting powder, $H_{ci}$=2400 Oe. The magnetic behavior of the composite with Fe is more complicated: it is dominated by the magnetically soft Fe, which has a magnetization about five times larger than that of the $(Sm_{0.95}Dy_{0.10})Fe_2$ component. The coercivity of the composite is consequently much smaller, $H_{ci}$=220 Oe. Nevertheless, the effect of the magnetically hard $(Sm_{0.95}Dy_{0.10})Fe_2$ is still evident in the demagnetization curve. This is best illustrated by considering the dotted line in FIG. 3, which is obtained by inverting the first quadrant behavior (offset by $H_{ci}$): this is the predicted behavior of a single-component system. The large deviation observed in the third quadrant reflects the delayed reversal of the magnetically hard component.

Figure 4:
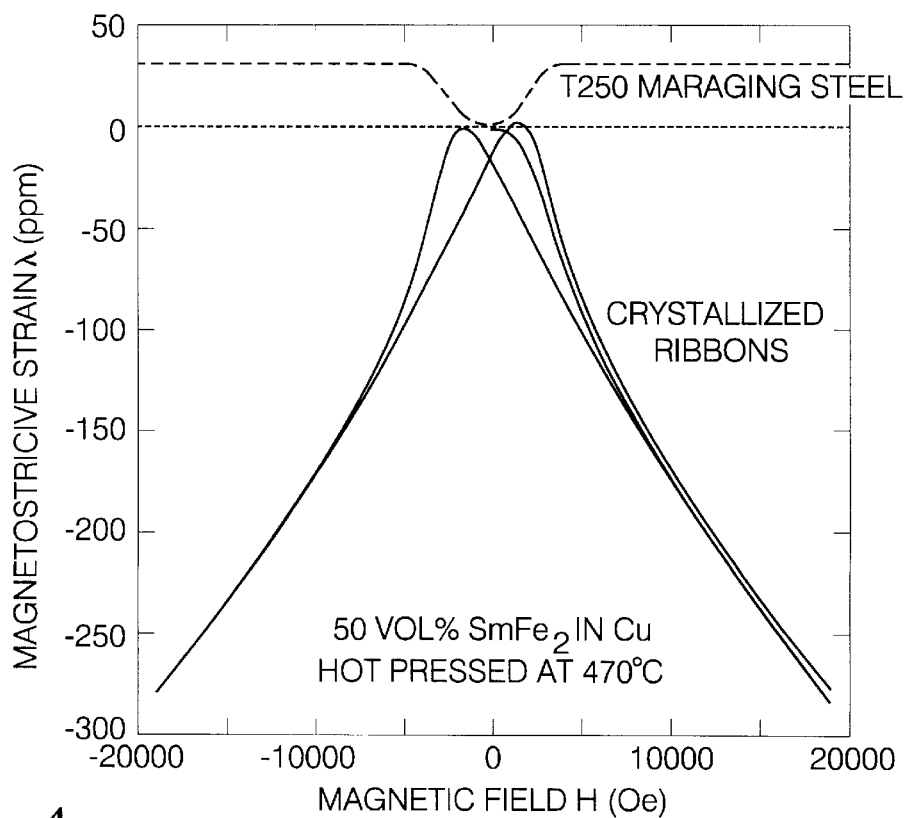
FIG. 4 is a graph of magnetostrictive strain $\lambda$ as a function of applied magnetic field H for the 50 volume percent SmFe$_2$/Cu composite. The magnetostriction of T250 maraging steel is shown for comparison.
Figure 5:
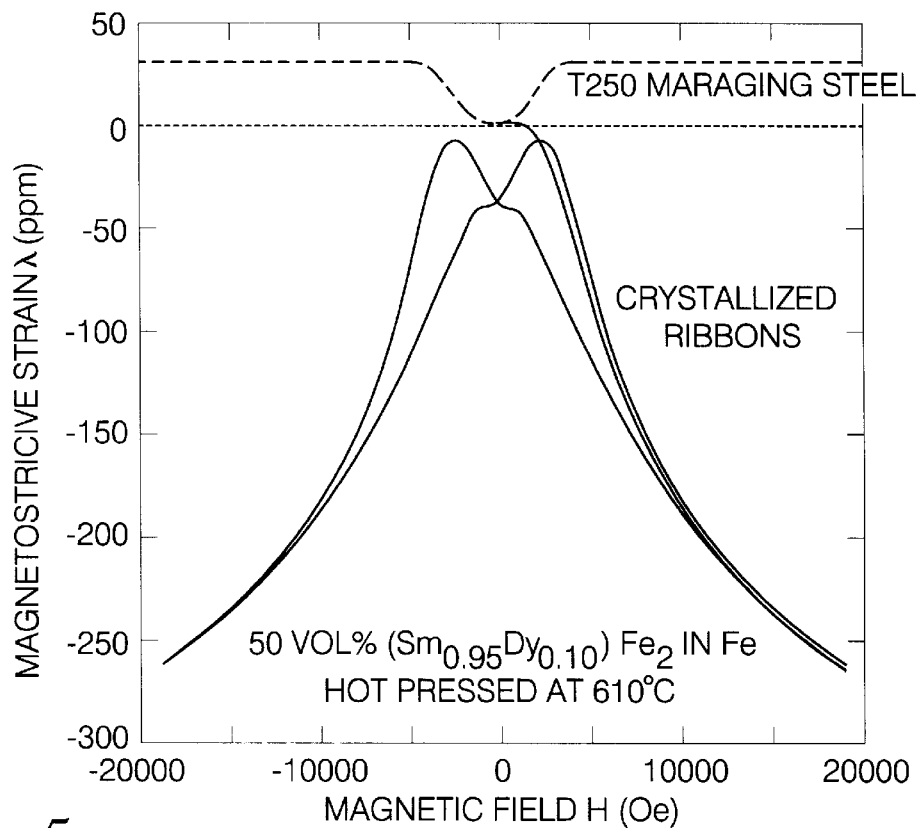
FIG. 5 is a graph of magnetostrictive strain $\lambda$ as a function of applied magnetic field H for the 50 volume percent (SM$_{0.95}$Dy$_{0.10}$)Fe$_2$/Fe composite. The magnetostriction of T250 maraging steel is shown for comparison.

The hysteresis observed in the demagnetization curves is reflected also in the magnetostrictive response to an applied magnetic field, as illustrated in FIG. 4 for $SmFe_2$/Cu and FIG. 5 for $(Sm_{0.95}Dy_{0.10})Fe_2$/Fe. The formation of wings on either side of zero field in FIG. 4, at field values of about ±2000 Oe, is a consequence of the magnetic hardness of the composite. Note that the wings in FIG. 5 are even more developed than those in FIG. 4, with peaks at about ±2500 Oe, even though the actual coercivity of the composite is much lower. The magnetostriction clearly illustrates the magnetically hard character of the magnetostrictive component in this composite. Additional structure in FIG. 5 near zero field is associated with the reversal of the Fe magnetization.

Figure 6:
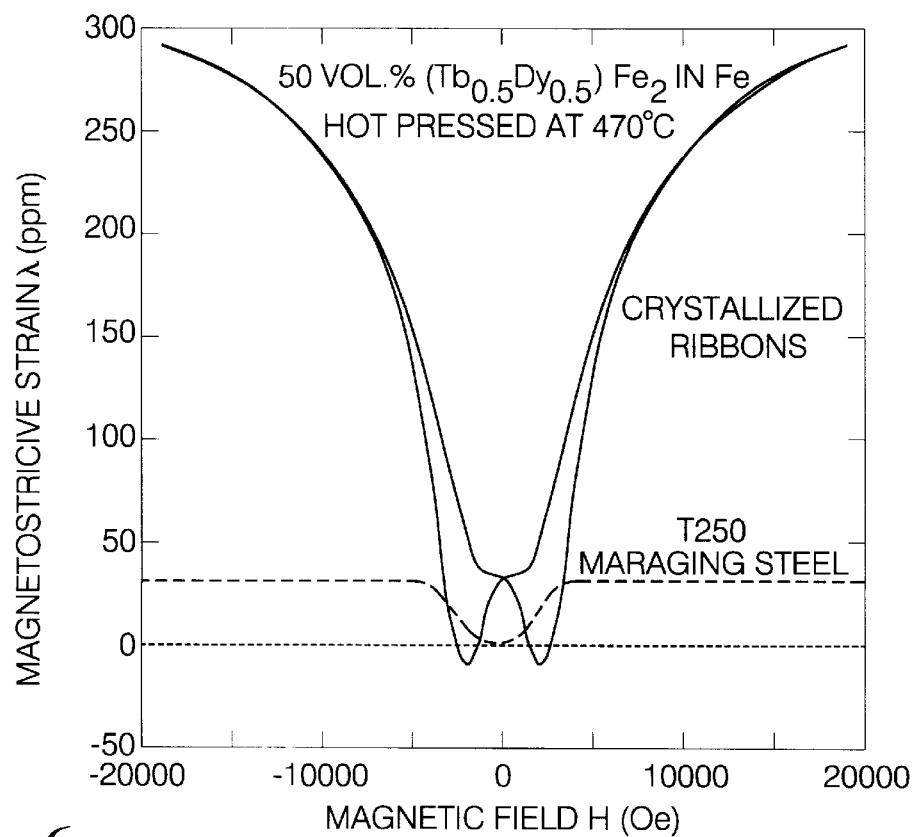
FIG. 6 is a graph of magnetostrictive strain $\lambda$ as a function of applied magnetic field H for the 50 volume percent (Tb$_{0.5}$Dy$_{0.5}$)Fe$_2$/Fe composite. The magnetostriction of T250 maraging steel is shown for comparison.

The above features are further illustrated in FIG. 6, which shows the magnetostriction of the $(Tb_{0.50}Dy_{0.50})Fe_2$/Fe composite as a function of the applied magnetic field. The strain is positive for this composite owing to the positive magnetostriction of $TbFe_2$. The minima in the wings occur at field values of about ±2000 Oe.

Torque response was tested using a sensor configuration as shown in FIG. 1B. First a 0.25 inch diameter hole was machined into the 0.5 inch diameter hot pressed cylinder to form a ring. The ring was then magnetized in the circumferential direction by slipping it onto a copper rod and passing a ~100 $\mu s$ electrical pulse having a peak current of ~7000 amps down the rod. That the ring remains circumferentially magnetized after removal from the magnetizing fixture is a consequence of the coercivity of the composite. Carefully aligned aluminum shafts 112 were then glued to the two flat surfaces of the ring 116 using a cyanoacrylic adhesive; this split shaft configuration 110 (FIG. 1B), rather than a solid shaft as in FIG. 1A, was used for test purposes to insure that the torque applied to the shafts was transmitted entirely by the ring. Clearly in this geometry there is no hoop stress in the ring 116. The assembly was mounted into a test jig, and the magnetic field on the outside diameter of the ring was measured using a Hall probe as torque was applied to the aluminum shafts. A strain gauge mounted to the outside diameter of the ring simultaneously measured the strain on the surface of the ring. Results are reported here in terms of the magnetic field detected by the Hall probe as a function of the strain induced in the ring by the applied torque; experience has shown that this quantity is the best measure to use when comparing sensors having very different geometries (especially ring inside and outside diameters).

Figure 7:
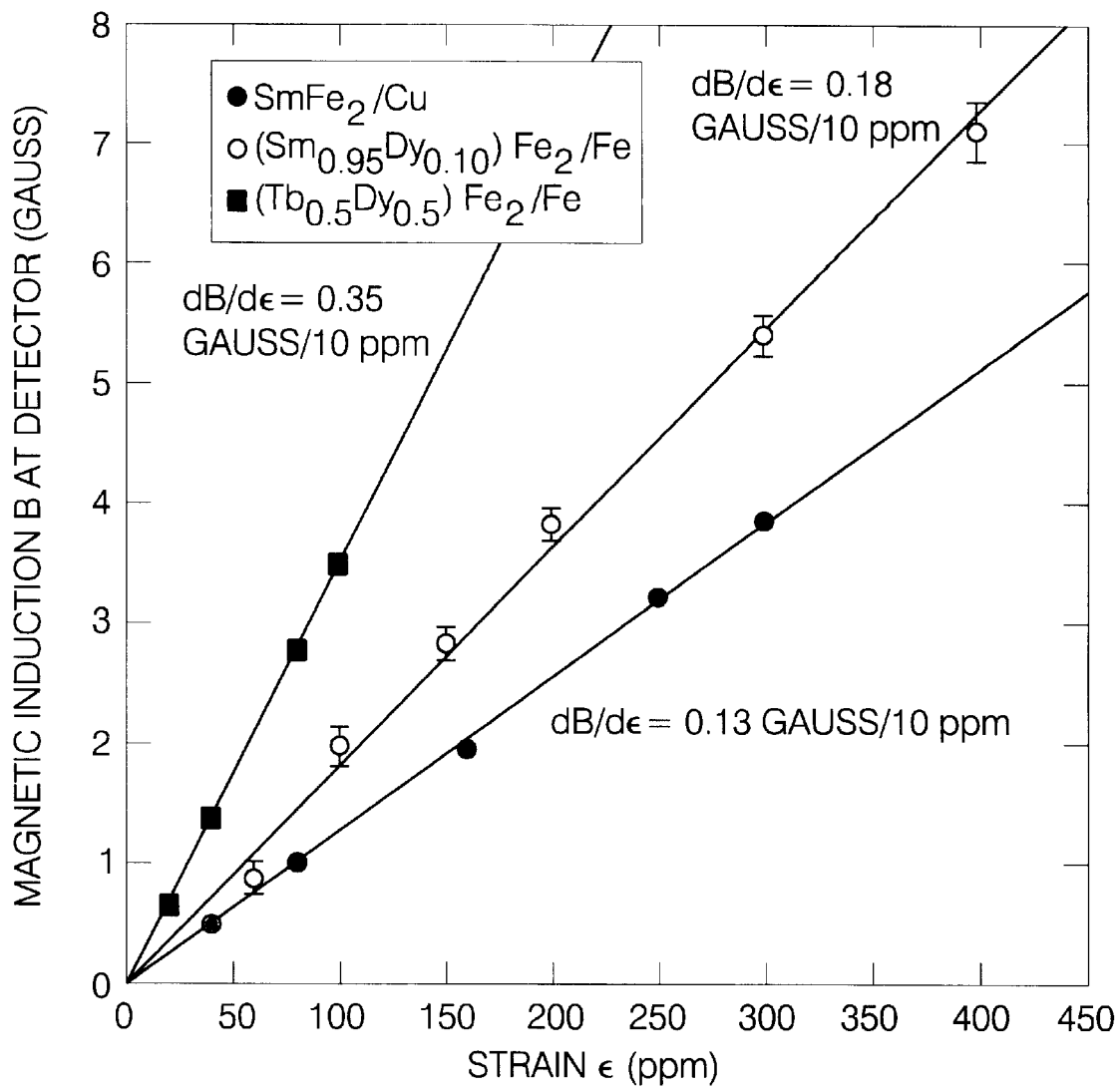
FIG. 7 is a graph of torque response of the composites, measured as the magnetic induction B detected by a Hall probe outside the magnetostrictive ring as a function of the strain $\epsilon$ on the surface of the ring induced by an applied stress. The slope dB/d$\epsilon$ of the response curve is the torque sensitivity.

The results of torque response tests are shown in FIG. 7, where the magnetic induction B detected outside of the ring is plotted as a function of the strain $\epsilon$ induced in the ring by the applied torque. The torque response is linear to within experimental error, and the torque sensitivity is $dB/d\epsilon$=0.13 Gauss/10 ppm of strain for the $SmFe_2$/Cu composite, $dB/d\epsilon$= 0.18 Gauss/10 ppm of strain for the $(Sm_{0.95}Dy_{0.10})Fe_2$/Fe composite, and $dB/d\epsilon=0.35$ Gauss/10 ppm of strain for the $(Tb_{0.5}Dy_{0.5})Fe_2$/Fe composite. These values are in all cases comparable to, and for the $(Tb_{0.5}Dy_{0.5})Fe_2$/Fe composite significantly greater than, the maximum torque response $dB/d\epsilon=0.25$ Gauss/10 ppm of strain realized in sensors assembled with maraging steel rings pressed onto nitronic steel shafts to obtain large hoop stress. For this specific sensor geometry, the $dB/d\epsilon$ values correspond to raw torque signals of about 1.2 Gauss/Nm of torque for $SmFe_2$/Cu, 1.6 Gauss/Nm for $(SM_{0.95}Dy_{0.10})Fe_2$/Fe, and 2.4 Gauss/Nm for $(Tb_{0.5}Dy_{0.5})Fe_2$/Fe, subject to the caveat that these latter numbers are valid only for this specific geometry and for a ring which is not stiffened by an underlying shaft.

Thus, a usable torque signal can be generated in a sensor similar to the one shown in FIG. 1A using $(Sm_{1-x}R_x)Fe_2$/metal or $(Tb_{1-x}R_x)Fe_2$/metal composites as the magnetostrictive element. The use of a magnetically hard composite, in which magnetocrystalline anisotropy and magnetic coercivity play the crucial role of maintaining circumferential magnetization, eliminates the need for the large hoop stress described in the above-identified Garshelis patents and paper and obviates the considerable technical difficulties, such as the complicated attachment scheme, attendant with a sensor based on hoop stress.

While this invention has been described in terms of a few embodiments, it is appreciated that other forms could readily be adapted by those skilled in the art. Accordingly, the scope of the invention is to be limited only by the following claims.

We claim:

1. In a magnetostrictive torque sensor for providing an output signal indicative of the torque applied to a member about an axially extending axis of said member comprising:
   a magnetostrictive active element directly or indirectly attached to or forming a part of the surface of said member in such a manner that torque applied to said member is proportionally transmitted to said element;
   said magnetostrictive active element being magnetically polarized in a circumferential direction, whereby when torque is applied to said member said magnetostrictive active element produces a magnetic field varying with said torque; and
   magnetic field sensor means mounted proximate to said magnetostrictive active element and oriented with respect thereto to sense the magnitude of said magnetic field and provide said output signal in response thereto,
   the improvement in which said magnetostrictive element comprises a composite body consisting essentially of discrete particles of magnetostrictive material selected from the group consisting of embedded in a strengthening metal matrix phase formed by hot mechanical deformation of metal particles, said composite body having an intrinsic coercivity, $H_{ci}$, of at least 100 Oersteds.

2. In a magnetostrictive torque sensor as recited in claim 1, the improvement in which said composite body consists essentially of the intermetallic compound $RFe_2$, where R comprises samarium and/or terbium.

3. In a magnetostrictive torque sensor as recited in claim 1, the improvement in which said composite body consists essentially of the intermetallic compound $RFe_2$, where R comprises samarium and said deformable metal is selected from the group consisting of aluminum.

4. In a magnetostrictive torque sensor as recited in claim 1, the improvement in which said composite body consists essentially of the intermetallic compound $RFe_2$, where R comprises samarium or terbium mixed with one or more of dysprosium, holmium, neodymium or praseodymium.

5. In a magnetostrictive torque sensor as recited in claim 1, the improvement in which said composite body consists essentially of the intermetallic compound $RFe_2$, where R comprises samarium or terbium mixed with one or more of dysprosium, holmium, neodymium or praseodymium and said deformable metal is selected from the group consisting of aluminum, copper, iron, magnesium, tungsten and nickel.

6. In a magnetostrictive torque sensor as recited in claim 1, the improvement in which said composite body consists essentially of the intermetallic compound $RFe_2$, where R comprises samarium or terbium mixed with one or more of dysprosium, holmium, neodymium or praseodymium and said deformable metal is selected from the group consisting of aluminum, copper, magnesium and tungsten, said composite body having an intrinsic coercivity of at least 1000 Oersteds.

7. In a magnetostrictive torque sensor as recited in claim 1, the improvement in which said composite body consists essentially of melt-spun particles of the intermetallic compound $RFe_2$, where R comprises samarium or terbium, said composite body having an intrinsic coercivity of at least 1000 Oersteds.

8. In a magnetostrictive torque sensor as recited in claim 1, the improvement in which said composite body consists essentially of melt-spun particles of the intermetallic compound $RFe_2$, where R comprises samarium or terbium mixed with one or more of dysprosium, holmium, neodymium or praseodymium, said composite body having an intrinsic coercivity of at least 1000 Oersteds.

9. In a magnetostrictive torque sensor as recited in claim 1, the improvement in which said composite body consists essentially of melt-spun particles of the intermetallic compound $RFe_2$, where R comprises samarium or terbium mixed with one or more of dysprosium, holmium, neodymium or praseodymium, and said deformable metal is selected from the group consisting of aluminum, copper, magnesium and tungsten, said composite body having an intrinsic coercivity of at least 1000 Oersteds.

10. In a transducing ring for attachment to a shaft to which a torque is to be applied about an axis extending axially thereof such that torque applied to said shaft is proportionally transmitted to said ring, said ring comprising a ferromagnetic, magnetostrictive element which is magnetically polarized in a circumferential direction, said ring producing a magnetic field varying with the torque applied to said shaft, the improvement where
   said magnetostrictive ring comprises a composite body consisting essentially of discrete particles of magnetostrictive material selected from the group consisting of (i) substantially single phase particles of the magnetostrictive intermetallic compound $RFe_2$, where R is one or more rare earth elements including Y, and/or (ii) amorphous particles of corresponding elemental composition, embedded in a strengthening metal matrix phase formed by hot mechanical deformation of metal particles, said composite body having an intrinsic coercivity, $H_{ci}$, of at least 100 Oersteds.

11. In a transducing ring as recited in claim 10, the improvement in which said composite body consists essentially of the intermetallic compound $RFe_2$, where R comprises samarium and/or terbium.

12. In a transducing ring as recited in claim 10, the improvement in which said composite body consists essentially of the intermetallic compound $RFe_2$, where R comprises samarium or terbium and said deformable metal is selected from the group consisting of aluminum, copper, iron, magnesium, tungsten and nickel.

13. In a transducing ring as recited in claim 10, the improvement in which said composite body consists essentially of the intermetallic compound $RFe_2$, where R comprises samarium or terbium mixed with one or more of dysprosium, holmium, neodymium or praseodymium.

14. In a transducing ring as recited in claim 10, the improvement in which said composite body consists essentially of the intermetallic compound $RFe_2$, where R comprises samarium or terbium mixed with one or more of dysprosium, holmium, neodymium or praseodymium and said deformable metal is selected from the group consisting of aluminum, copper, iron, magnesium, tungsten and nickel.

15. In a transducing ring as recited in claim 10, the improvement in which said composite body consists essentially of the intermetallic compound $RFe_2$, where R comprises samarium or terbium mixed with one or more of dysprosium, holmium, neodymium or praseodymium and said deformable metal is selected from the group consisting of aluminum, copper, magnesium and tungsten, said composite body having an intrinsic coercivity of at least 1000 Oersteds.

16. In a transducing ring as recited in claim 10, the improvement in which said composite body consists essentially of melt-spun particles of the intermetallic compound $RFe_2$, where R comprises samarium or terbium, said composite body having an intrinsic coercivity of at least 1000 Oersteds.

17. In a transducing ring as recited in claim 10, the improvement in which said composite body consists essentially of melt-spun particles of the intermetallic compound $RFe_2$, where R comprises samarium or terbium mixed with one or more of dysprosium, holmium, neodymium or praseodymium, said composite body having an intrinsic coercivity of at least 1000 Oersteds.

18. In a transducing ring as recited in claim 10, the improvement in which said composite body consists essentially of melt-spun particles of the intermetallic compound $RFe_2$, where R comprises samarium or terbium mixed with one or more of dysprosium, holmium, neodymium or praseodymium, and said deformable metal is selected from the group consisting of aluminum, copper, magnesium and tungsten, said composite body having an intrinsic coercivity of at least 1000 Oersteds.

\* \* \* \* \*